March 10, 1953     H. W. HICKS     2,630,974

RAIL BOND

Filed Sept. 10, 1948

INVENTOR.
HORACE W. HICKS
BY
ATTORNEY

Patented Mar. 10, 1953

2,630,974

UNITED STATES PATENT OFFICE 2,630,974

RAIL BOND

Horace W. Hicks, Omaha, Nebr.

Application September 10, 1948, Serial No. 48,659

2 Claims. (Cl. 238—14.13)

My invention relates to rail bonds to electrically connect the adjacent ends of abutting rails and which may be brazed or welded to the rails to form therewith an integral part thereby providing a connection between the rails of high electrical efficiency and which is of a simple economical construction which may be quickly affixed to the rails.

It is also an object of my invention to provide a rail bond which may be economically manufactured.

Another object of my invention is to provide a rail bond in which the conductor ends may contact the rail surface thereby reducing the contact resistance to a very low value.

Another object is to provide a bond in which the faces of the terminals to be attached to the rail are coated with the brazing metal forming an integral part of the terminal.

A still further object of this invention is to provide a novel and quick method of attaching the rail bond to the rail.

The above and other objects, together with a full description of my bond, the method of manufacture and the method of application to the rail are set forth in the specification and claims and the annexed drawing.

In the drawing—

Figure 7:
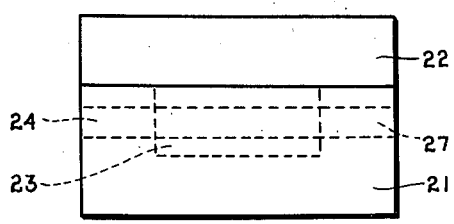
Figure 8:
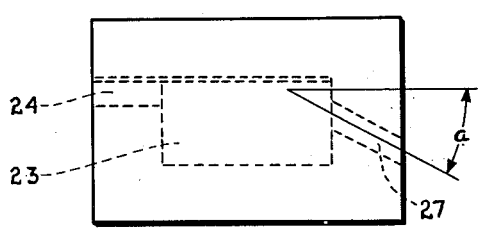
Figure 9:
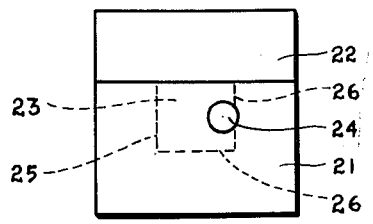

Figs. 7, 8, and 9 are three position views of a jig which may be used in drilling the terminal, namely top and side and end views respectively.

Figure 10:
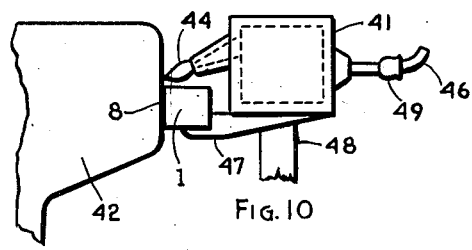

Fig. 10 is an end view of a rail with a terminal positioned thereon and showing a means for supporting and heating the rail and bond.

Figure 11:
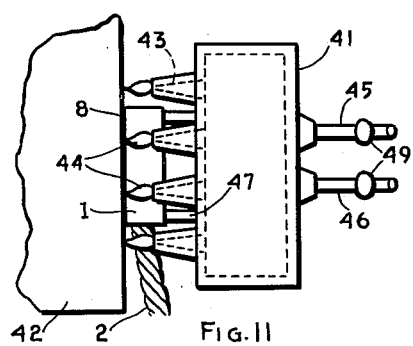

Fig. 11 is a top view of Fig. 10.

In a preferred embodiment of my invention I employ a pair of spaced terminals 1 connected by a conductor 2. The terminals 1 are preferably of a non-corroding non-ferrous metal such as copper, bronze or brass but may be of a ferrous metal in some cases. The conductor 2 is preferably of copper or a copper alloy such as Phosphor bronze preferably hard drawn. The conductor may be concentric or rope layed composed of a number of small wires to give flexibility.

The terminals shown in Figs. 1 to 6 inclusive are somewhat larger than necessary while that shown in Figs. 10 and 11 is more nearly the preferred size namely, about 1" long, $\tfrac{5}{16}$" by $\tfrac{3}{8}$" in cross-section.

One of the objects of my invention is to provide a construction in which the ends of the conductor 2 may be brought into direct contact with the rail face or substantially so, as desired, and therefore I have devised what I believe to be a novel method and means for accomplishing this object.

The terminal body is formed to the desired size and shape and preferably of copper or copper alloy and may have square or rounded ends or of other configuration. To mount the conductor end in the terminal so as to engage the rail or substantially so the terminal is provided with a channel 3 which is formed by drilling longitudinally from the outer end of the terminal, the channel 3 being parallel to and so related to the attaching face 4 of the terminal as to form a slot 5 of substantially uniform width for at least a portion of the length of the terminal.

The drill used is substantially of the diameter of the conductor or a trifle greater whereby the end of the conductor will rest in the channel 3 and a portion of its longitudinal surface project into the slot 5 or a trifle beyond if desired and which will be better understood from an inspection of Figs. 3 to 6 inclusive.

By regulating the position of the drill with reference to the attaching surface 4, the width of the slot may be varied and the projection if any of the conductor surface with respect to the attaching surface 4 varied. The closer the drill axis is to the surface 4 the more the conductor surface will extend beyond the surface 4.

In order that the conductor may enter the channel 3 and that portion of the conductor between terminals be spaced from the rail surface a second channel 6 is drilled at an angle —a— to the longitudinal axis of the terminal or of the channel 3 or face 4 from the inner end of the terminal starting at a point spaced from the surface 4. The angle being such that the channel 6 will intersect the channel 3. This may cause the drill to penetrate the surface 4 and slightly enlarge the width of the slot 5 as at 7. I have found that if the angle —a— is about 25 degrees the conductor will leave the end of the terminal with a not too sharp a bend at —b—.

Figure 1:
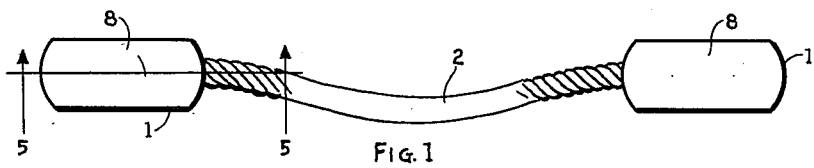
Fig. 1 is a top plan view of my bond.
Figure 2:
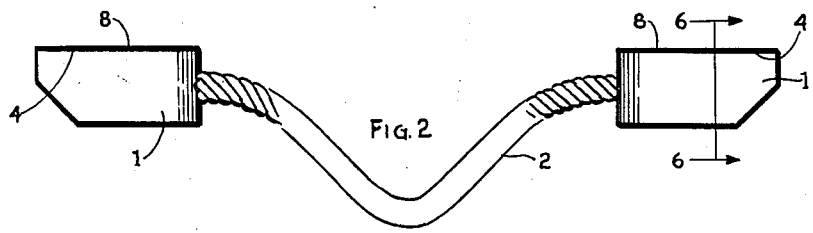
Fig. 2 is a side elevation of Fig. 1.
Figure 4:
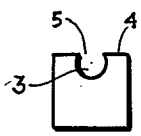
Fig. 4 is an end view of the left hand end of Fig. 3.
Figure 3:
Fig. 3 is a top plan view of one of the terminals before assembly with the conductor.
Figure 6:
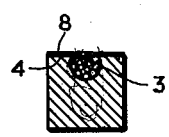
Fig. 6 is a vertical transverse section of an assembled terminal on the line 6—6 of Fig. 2.
Figure 5:
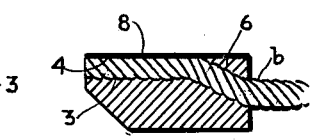
Fig. 5 is a vertical longitudinal partial section of an assembled terminal on the line 5—5 of Fig. 1.

It is now possible to insert the end of the conductor 2 into the channel 6 and cause it to be moved into and along the channel 3 as shown in Fig. 5. By entering the conductor through the channel 6 the conductor is off-set from the rail somewhat which is desirable.

After the conductor end has been positioned in the terminal a sheet of silver brazing alloy of desired thickness and of a size to cover the face 4 of the terminal is positioned on the face 4 and heat is applied sufficient only to heat the terminal end of the conductor and the silver brazing alloy until the alloy is fused and runs whereupon some of the silver alloy will flow into the channel 3 and unite the conductor to the surface of the channel 3 and the balance of the fused metal will unite with the surface 4 of the terminal forming a layer or film 8 thereon to be used to unite the terminal to the rail. The attaching face 4 of the terminal is coated with the brazing alloy and the conductor brazed in position in one and the same heating operation.

While the brazing alloy may be the usual copper-zinc alloy I prefer to use what is known as silver brazing alloy or solder and one having a fusing point considerably lower than that of the terminal especially must this be watched if the terminal is made of brass. I have found that a silver solder melting at about 1200 degrees F. and which flows at a slightly higher temperature gives excellent results.

I have further found that if the silver solder is cut from a sheet of about .015" thick and applied to the attaching face of the terminal and conductor as above described the resulting film of brazing alloy remaining on the attaching face 4 of the terminal will be about .008" thick or if thicker then the brazing metal should be dressed to that thickness.

When a bond with terminals coated with about .008" of silver solder is applied to the rail some of the solder will be squeezed from between the terminals and rail leaving an attaching film of silver brazing alloy about .003" thick and the excess solder will form a small fillet around the terminal at the rail.

I prefer to use silver brazing alloy or solder because I have found it to give a stronger attachment of the terminals to the rail than non-silver solders but the thickness of the film between the terminal and rail should be kept relatively small to secure the greatest shearing strength.

In order to provide the terminal with the channels 3 and 6 I have found it quite advantageous to use a jig in which the terminal may be placed and the drill guided to form the channels as required.

This jig may be of any desirable construction to secure the proper results but I have shown in Figs. 7, 8 and 9 a jig which may be used and which consists of two parts, a body 21 and a cover 22. The body has a recess 23 formed in one face of a size to receive the terminal and hold it firmly while being drilled.

From one end of the body 21 leads a guide channel 24 of the drill size proper for the channel 3 and conductor 2 and properly positioned with respect to the recess 23 to properly position the channel 3. It will be noted in Fig. 9 that the terminal will fit between the face 25 and shoulders 26 and be held rigidly while drilling the channel 3.

At the opposite end of the form a guide channel 27 (see Fig. 8) is provided of proper drill size and of proper angle —a— whereby the channel 6 may be formed in the terminal and the axis of which will intersect the axis of the drill guide 24.

When the terminal is in position in the recess 23 its ends will substantially contact the end faces of the recess and when the cover 22 is in place the terminal will be held practically immovable.

The cover may be held by a clamp such as a C clamp or any other suitable means well known to those skilled in the mechanical arts, and dowel pins used if desired to guide the cover into proper position.

The installation of the bond is accomplished preferably by a multiple flame burner 41 suitable for a mixture of oxygen and acetylene gases or others.

In Figs. 10 and 11 I show a very simple apparatus and a bond terminal 1 positioned on the side face of a rail 42 adjacent its end and a simple form of burner 41 provided with a plurality (4) of jets 43 capable of producing very small flames 44. The burner is hollow and the gases fed to it through the tubes 45 and 46. Arms 47 support the terminal 1 and position the burner relative to the rail and terminal and the burner and arms are mounted on a suitable support 48. The gas flow is regulated by valves 49.

The burner may be supported by other means as well known in the art and a much more elaborate equipment may be devised for applying heat. It will be noted that the flames 44 are applied directly against the rail and not against the terminal 1. This is preferable as the rail mass is much greater than that of the bond terminal and when the rail has reached the fusing temperature of the brazing metal 8 the heat on the terminal will be substantially the same.

I am reserving for another application a more complicated and automatically controlled apparatus for applying heat to the rail.

If desired a flux may be used both when the coating 8 is being applied to the terminal and when the bond is being installed on the rail; fluxes for this work are in common use.

Where a single flame is applied to the bond terminal and rail simultaneously, the brazing metal is very likely to be fused before the rail is sufficiently heated for the molten brazing metal to "wet" the rail surface and form a strong coherence therewith hence a weak union but by applying a plurality of small flames directly to the rail adjacent the bond terminal the two parts are brought substantially to a uniform heat and the solder fused to the rail surface to form a proper coherence.

Also a plurality of small flames applied as above is more economical in gas consumption than a single large flame which spreads over the terminal and adjacent rail surface.

In applying the bond the rail surface should be ground or otherwise treated to remove the scale, rust and grease and it is advisable to employ a flux of which there are many kinds supplied by those selling brazing materials and pressure should be applied to the terminal at the time of applying heat.

In applying the brazing alloy, care should be taken to keep the same out of the channel 6. If the conductor is well attached to the surface of the channel 3 by the brazing alloy, that is entirely sufficient and the conductor is left free in the channel 6.

The channel 3 may be formed for the entire length of the terminal if desired in which case the slot 5 will extend for the length of the terminal providing the channel 3 is formed parallel to the attaching face 4.

While the channels 3 and 6 are referred to as drilled, they may be formed by other means as for instance should the terminal be formed by forging.

Having described my invention, I claim:

1. A rail bond comprising a pair of spaced terminals of metal, each terminal having a substantially monoplanar surface extending the entire length and width of one side of the terminal and adapted to be integrally attached to a side face of a rail head, each terminal having a longitudinal channel extending along and parallel to the plane of said monoplanar surface and opening into the said surface, each terminal having a second channel extending from one end of the terminal in an angular direction to said surface and opening into the first said channel, a conductor having its ends extending through the angularly disposed channels and along the first said channels and united to the terminals to electrically connect said terminals together, a layer of brazing alloy over the said monoplanar surfaces and covering the portions of the conductors exposed through the said surface, and brazing alloy in the first said channels and uniting the conductor to the terminals, whereby the terminals and conductor ends may be attached to a rail head side face.

2. An article of manufacture for attachment to a rail comprising a terminal having a substantially monoplanar surface extending the entire length and width of one side of the terminal and adapted to be integrally attached to a side face of a rail head, a longitudinal channel extending along and parallel to the plane of said monoplanar surface and opening into the said surface, a second channel extending from one end of the terminal in an angular direction to said surface and intersecting the first said channel, a conductor having an end positioned in said channels, the first said channel being so constructed and related to the monoplanar surface that a portion of the longitudinal surface of the conductor is exposed at the said monoplanar surface side of the terminal, a layer of brazing alloy over the said monoplanar surface and covering the longitudinal portion of the conductor exposed through the said surface, and brazing alloy in the first said channel and uniting the conductor to the terminal, whereby the terminal and conductor end may be attached to a rail head side face.

HORACE W. HICKS.

REFERENCES CITED

The following references are of record in the file of this patent:

UNITED STATES PATENTS

| Number | Name | Date |
|---|---|---|
| 461,562 | Ball | Oct. 20, 1891 |
| 464,022 | Hield | Dec. 1, 1891 |
| 656,125 | Kleinschmidt | Aug. 14, 1900 |
| 802,967 | Brown | Oct. 31, 1905 |
| 1,268,328 | Crecilius | June 4, 1918 |
| 1,276,426 | Slimp | Aug. 20, 1918 |
| 1,369,927 | Linderman | Mar. 1, 1921 |
| 1,513,805 | Febrey | Nov. 4, 1924 |
| 1,673,424 | Ryder | June 12, 1928 |
| 1,675,750 | Dahlstrom et al. | July 3, 1928 |
| 1,852,694 | Cadwell | Apr. 5, 1932 |
| 1,865,717 | Nardini | July 5, 1932 |
| 1,996,721 | Gibbs | Apr. 2, 1935 |
| 2,014,983 | Quarnstrom | Sept. 17, 1935 |
| 2,022,544 | Huber | Nov. 26, 1935 |
| 2,180,318 | Deems | Nov 14, 1939 |
| 2,251,176 | Temple, Jr. | July 29, 1941 |